Figure 1:
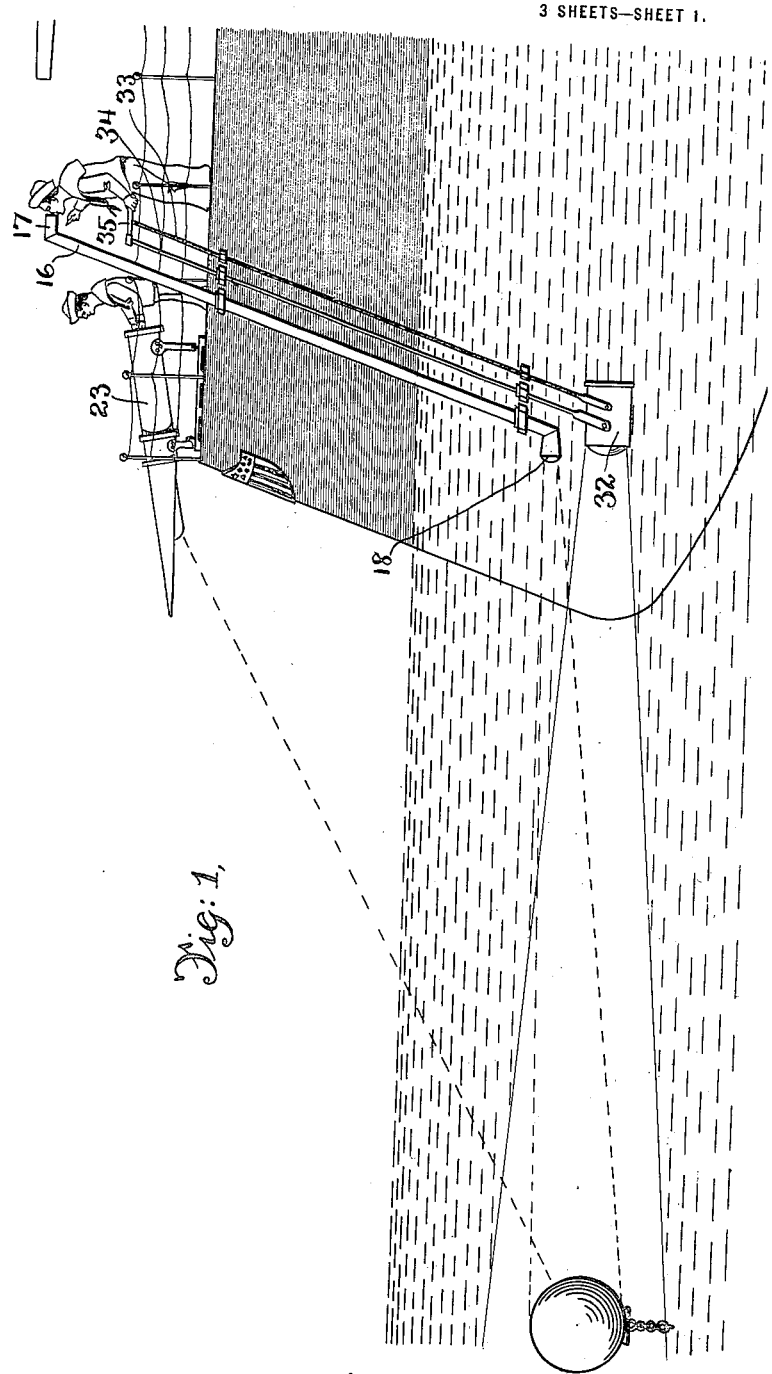

H. C. PARKER & E. G. HATCH.
APPARATUS FOR DETECTING AND DESTROYING SUBMARINES, MINES, AND THE LIKE.
APPLICATION FILED FEB. 26, 1915.

1,172,306.

Patented Feb. 22, 1916.
3 SHEETS—SHEET 1.

Witnesses:
Arthur S. Dannell,
M. J. O'Donnell

Herschel C. Parker, Inventors
and Edwin G. Hatch,
By their Attorney,
W. B. Hutchinson.

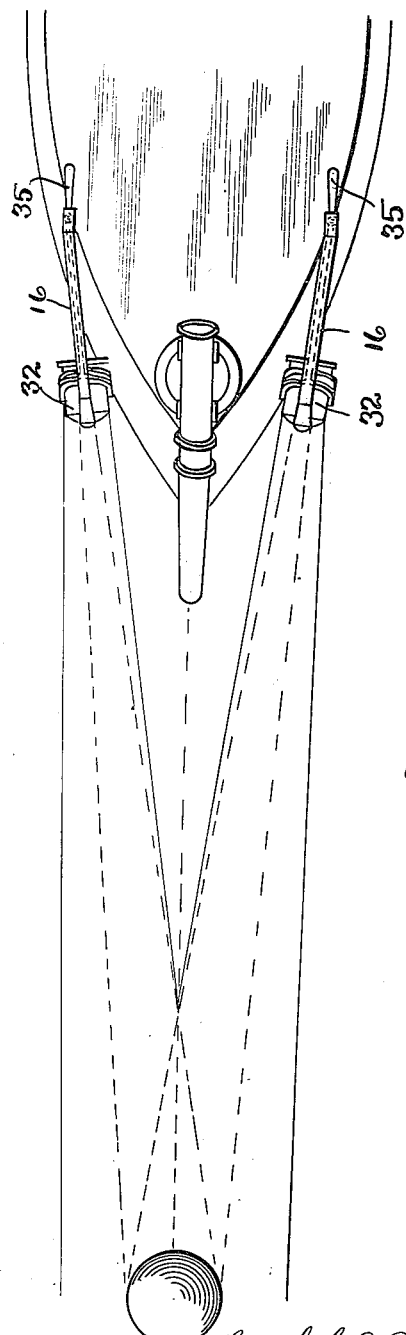

H. C. PARKER & E. G. HATCH.
APPARATUS FOR DETECTING AND DESTROYING SUBMARINES, MINES, AND THE LIKE.
APPLICATION FILED FEB. 26, 1915.
1,172,306.
Patented Feb. 22, 1916.
3 SHEETS—SHEET 3.
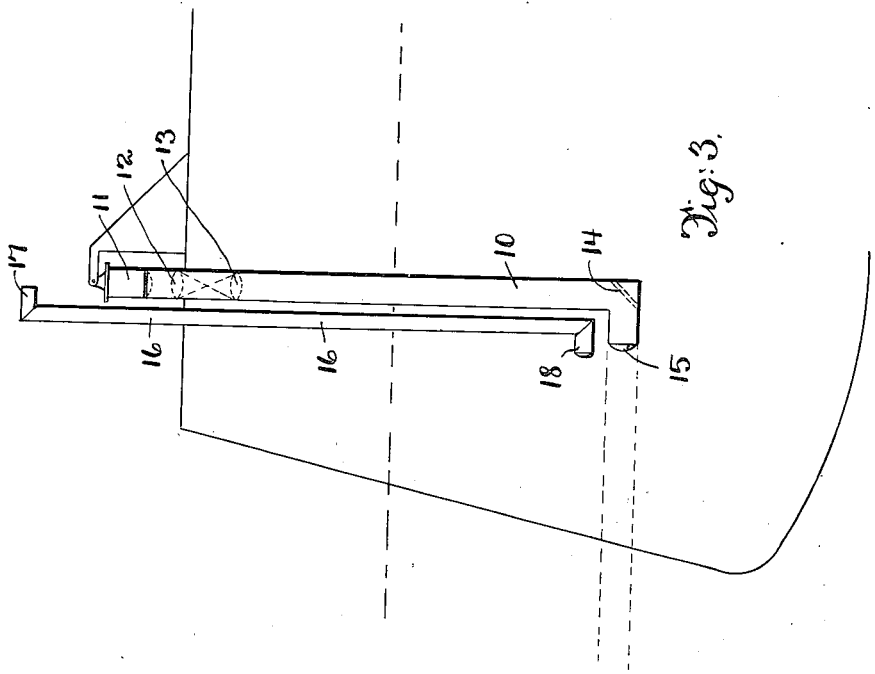
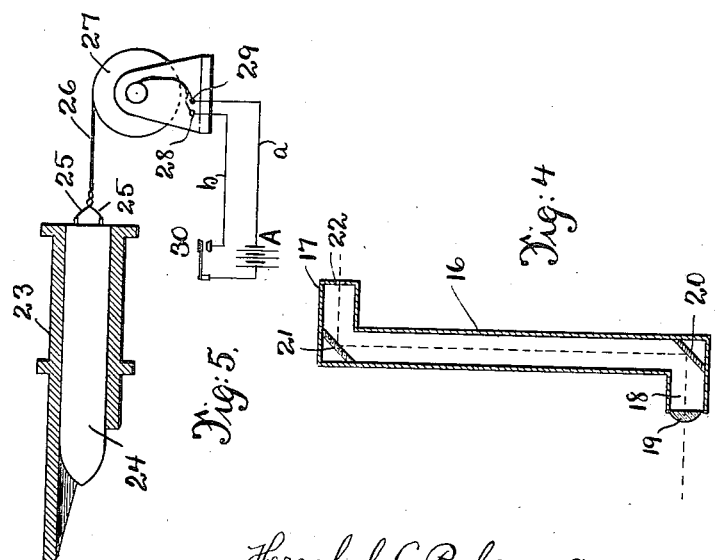
Witnesses: 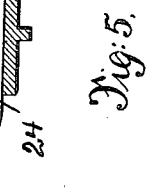
Herschel C. Parker
and Edwin G. Hatch
Inventors,
By their Attorney
W. P. Hutchinson

UNITED STATES PATENT OFFICE.

HERSCHEL C. PARKER, OF BROOKLYN, NEW YORK, AND EDWIN G. HATCH, OF HOBOKEN, NEW JERSEY, ASSIGNORS OF TWO-THIRDS TO SAID PARKER AND ONE-THIRD TO SAID HATCH.

APPARATUS FOR DETECTING AND DESTROYING SUBMARINES, MINES, AND THE LIKE.

1,172,306.     Specification of Letters Patent.    Patented Feb. 22, 1916.

Application filed February 26, 1915. Serial No. 10,704.

*To all whom it may concern:*

Be it known that we, HERSCHEL C. PARKER, of the borough of Brooklyn, county of Kings, and State of New York, and EDWIN G. HATCH, of Hoboken, county of Hudson, and State of New Jersey, both citizens of the United States, have invented a new and useful Improvement in Apparatus for Detecting and Destroying Submarines, Mines, and the like, of which the following is a full, clear, and exact description.

Our invention relates to improvements in apparatus for locating submarines, mines, or other subsurface things, and for destroying such objects when located, if desired.

Our invention is therefore primarily intended for use on war vessels for the purpose of locating and destroying such things as submarines and mines, and on shore batteries and observation points for the same purpose, though our invention has also a commercial value as it affords protection to vessels against icebergs, sunken rocks, and other dangers, as will presently appear. The chief danger from submarines and mines lies in the fact that they cannot be located, because if they were seen, a surface vessel of good speed and greater mobility could easily avoid them, or a war vessel properly equipped could as easily destroy them. Our invention is intended, therefore, to apply to all the points necessary to the preservation of a vessel and the destruction of the threatened danger. To this end we use what we term a helioscope, by means of which a powerful searchlight can be submerged at a desired part of a vessel, and will illuminate the water below the surface for a distance from the vessel so that any sub-surface object can be readily seen. Such an object, however, could not be readily seen from the surface, and we therefore use in connection with our helioscope, what we term a mariscope, which is also submerged at one end, and through which one can get at least the outline of any object which appears floating in the light field of the helioscope. Finally we arrange a torpedo tube of any approved kind, in close proximity to the means for locating the threatened danger, so that when located, a torpedo may be discharged against it, or in the vicinity of it, and exploded so as to destroy the mine, submarine, or whatever threatens.

A further object of our invention is to produce our apparatus in such a way that it can be very readily attached, and without great expense, to the hull of any marine vessel, and there used for the purposes stated.

Our invention, as will appear from the description which follows, does not relate to details, but rather to the organization and arrangement of well known devices which will give us the desired result, all of which will appear clearly from the following description.

Reference is to be had to the accompanying drawings forming a part of this specification, in which similar reference characters indicate corresponding parts in all the views.

Figure 1 is a diagrammatic side elevation showing the bow of a vessel equipped with our apparatus, and with a submerged mine appearing in the light field. Fig. 2 is a diagrammatic plan of the apparatus as shown in Fig. 1. Fig. 3 is a diagrammatic elevation showing a preferred form of the helioscope or lighting device. Fig. 4 is a vertical longitudinal section of the mariscope or finder, and Fig. 5 is a sectional diagram illustrating one means of equipping a torpedo so that it can be exploded by an electric spark at the desired moment.

It is necessary to provide means for detecting a submerged element of danger, and for this we prefer the form of lighting device or helioscope shown in Fig. 3, in which a tube 10 is connected to the side of a vessel, preferably near the bow, although it can be located at any desired point, and at the top of the tube is a powerful searchlight 11, of any approved kind, which throws its rays through lenses 12 and 13 arranged to hold the rays in parallel relation. These rays are directed against a powerful mirror 14 which is arranged at an angle at the lower end of the tube, and refracts the rays through the lens 15 at the outlet of the tube. This lens can be shaped to throw the rays in parallel relation or to give any amount of divergence desired, as is well known in the art.

It will be seen that a very powerful searchlight 11 can be used, and that consequently an enormous flood of light can be directed in the pathway ahead of the vessel, and if one lighting apparatus is used on each side of the bow, the rays can be arranged to converge so that a very large field is illuminated at a point beneath the surface. Obviously the tube 10 can be attached to the hull in such a way as to be raised or lowered so as to bring the light at any desired point, and the mirror 14 can be movable for this purpose, but we have not gone into these details as they do not concern the general scope of the invention.

Having lighted the submerged field, the next necessary thing is to properly observe it, and to this end we use an observation tube which can be any of the well known devices for seeing beneath the surface, but we prefer to use what we term a mariscope 16 which is arranged adjacent to the tube 10, and has offsets 17 and 18 at top and bottom. A lens 19 is provided at the lower extremity of the tube, and opposite this is an inclined mirror 20 which is arranged to focus on a mirror 21 at the upper end of the tube, and from this rays are refracted to the sight hole 22 at the end of the offset 17, so that when any object appears in the light field, its image or at least a shadow or reflection of it will be caught by the mariscope and seen in the sight opening 22.

Having located the object to be destroyed, it is then necessary to have some means at hand of attaining this end. We have shown, therefore, a torpedo tube 23 at the bow of the vessel and adjacent to the means for locating the object, and we have illustrated this in a conventional way in Fig. 5, with a torpedo in place for discharge. We wish it distinctly understood, however, that our invention does not lie in any detail of the torpedo tube or of its location, but that any means for discharging a torpedo or the like from the bow or from the submerged part of the vessel, can be employed in connection with our means for locating said object. We have shown in Fig. 5, however, a convenient means for exploding the torpedo when it hits or reaches the vicinity of the object to be destroyed. As illustrated the torpedo has connecting wires 25 connecting with any usual or preferred sparking device, and wound into a cable 26 which is carried on a reel 27, and the terminals 28 and 29 on board the vessel are connected by means of wires a and b with a source of supply of electricity A and the circuit is provided with a key 30. When it is seen that the torpedo is in the immediate vicinity of the submarine, mine, or other object, it can be exploded by closing the circuit.

By reference to Fig. 2 it will be seen that by having the lights arranged on opposite sides of the vessel's bow, and converging the rays upon an object, this will afford a means of giving the operator of the torpedo tube a good line on the object to be destroyed, as he will aim at the point where the rays of the two lights meet.

In Figs. 1 and 2 we have shown another means of lighting a submerged field in the vicinity of a vessel. In this case submerged search-lights 32 are used instead of the helioscope, and these can be operated in any convenient manner. We have shown them connecting by rods 33 and 34 with a lever 35, by means of which the lights may be swiveled or tipped vertically so as to illumine the desired field.

From the foregoing illustrations and descriptions it will be clear that the functions of our invention are to locate a submerged object, to provide means for observing any object appearing in the field, and to provide means for destroying such object. The details of the construction of the several parts of the invention are unimportant. It is necessary to provide submerged means of observation to get the best results, because even though the field is lighted, it is difficult to look into the water from above the surface, especially on an angle, but with our means for lighting the large field and our submerged means of observation, any object appearing in such field can be readily seen. We have shown our apparatus attached to the bow of a vessel, but it is obvious that it can be applied to any other part of the vessel as well, and thus provide a certain means of defense. As a means of offense the importance of the invention will be readily seen, and it will be noticed that if several vessels equipped with our apparatus were approaching abreast a mine field or submarines, a very extensive field would be illuminated and placed under observation so that the objects of danger could be very easily destroyed. It will also be readily seen that where the objects of danger are readily located, a surface vessel because of its greater speed and mobility, can easily avoid such objects, even if it cannot destroy them. It will also be understood that while our invention is primarily intended for use in war, still for commercial purposes it has great value as by it submerged objects of danger such as icebergs, sunken rocks, wrecks, and the like, can be readily located and observed, and in times of fog, a vessel can by the means disclosed, locate an approaching vessel or any object of danger which is being approached by the vessel carrying our equipment.

It will be understood that the whole apparatus can be easily applied to the exterior of the vessel without the necessity of injuring the hull or cutting holes therethrough. Attention is further called to the facts that any preferred means other than electrical can be used for projecting light into the tube 10, and that if desired the submerged lights can be red and green on appropriate sides of the vessel, so that another vessel could distinguish port from starboard, and tell the direction in which the vessel is moving, and if desired the parts can be made to throw beams of polarized light, or the lights may be suitably tinted to give them the best penetration. It will also be understood that cross wires may be employed in either the helioscope or mariscope to center them on the object under observation by the method of colimation, and the torpedo tubes aimed by the method of coincident or parallel axes, that is in which the axis of the torpedo tube is parallel or coincident with the axes of the means for projecting the light beam.

In operating our apparatus in daylight, and especially in bright sunlight, it will be found advantageous to cover the top of the observation tube 16 with a hood or housing, so that the observer can be in a darkened room and out of the glare of the sun. By this means the image appearing through the tube can be more clearly discerned.

We claim:—

1. An apparatus of the kind described comprising a search light arranged to light an area of water beneath the surface, means above the surface for operating the search light, and an observation tube independent of the light but projecting below the water and having a glass covered opening in the submerged part and an observation opening in the unsubmerged part.

2. An apparatus of the kind described comprising a search light, means for lighting a subsurface field of water with the search light, means located above the water for operating and directing the search light, and means independent of the light and light projecting means for taking observations in the said field of light.

3. An apparatus of the kind described comprising a tube having a submerged end with means for projecting light from said submerged end, means for projecting light rays into the upper end of the tube, and a second or observation tube having one end submerged, the second tube having a glass covered opening and the upper end of the tube having means for taking observations through the tube.

HERSCHEL C. PARKER.
EDWIN G. HATCH.

Witnesses:
WARREN B. HUTCHINSON,
ARTHUR G. DANNELL.